US009831991B2

(12) United States Patent
Li et al.

(10) Patent No.: US 9,831,991 B2
(45) Date of Patent: Nov. 28, 2017

(54) COOPERATIVE COMMUNICATION METHOD AND SYSTEM, ACCESS NETWORK DEVICE, AND USER EQUIPMENT

(71) Applicant: Huawei Technologies Co., Ltd., Shenzhen (CN)

(72) Inventors: Yue Li, Shenzhen (CN); Fei Yang, Shenzhen (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 14/623,953

(22) Filed: Feb. 17, 2015

(65) Prior Publication Data

US 2015/0163026 A1    Jun. 11, 2015

Related U.S. Application Data

(63) Continuation of application No. PCT/CN2012/080316, filed on Aug. 17, 2012.

(51) Int. Cl.
*H04L 5/00* (2006.01)
*H04B 7/02* (2017.01)
(Continued)

(52) U.S. Cl.
CPC ........... *H04L 5/0032* (2013.01); *H04B 7/026* (2013.01); *H04W 88/04* (2013.01); *H04L 5/0035* (2013.01); *H04W 36/30* (2013.01)

(58) Field of Classification Search
CPC ....... H04L 5/0032; H04W 88/04; H04B 7/026
See application file for complete search history.

(56) References Cited

U.S. PATENT DOCUMENTS 6,987,978 B2 * 1/2006 Masuda ............... H04B 7/2606
455/456.4
9,179,444 B2 * 11/2015 Van Phan ............. H04W 16/26
(Continued)

FOREIGN PATENT DOCUMENTS

CN        101394665 A       3/2009
CN        101882979 A       11/2010
(Continued)

OTHER PUBLICATIONS

"3rd Generation Partnership Project; Technical Specification Group Core Network and Terminals; Mobile Radio Interface Layer 3 Specification; Core Network Protocols; Stage 3 (Release 11)," 3GPP TS 24.008, V11.3.0, Jun. 2012, 670 pages.
(Continued)

*Primary Examiner* — Omer S Mian
(74) *Attorney, Agent, or Firm* — Slater Matsil, LLP

(57) ABSTRACT

Embodiments of the present invention provide a cooperative communication method and system, an access network device, and a user equipment. The method includes, when a access network device receives downlink data belonging to a first user equipment UE, if it is determined that a supporting UE in a support list of the first UE cannot serve as a current supporting UE of the downlink data, establishing a cooperative communication relationship between a second UE and the first UE, that is, setting the second UE as the current supporting UE of the first UE. The second UE is another UE except the first UE and the supporting UE in the support list of the first UE. The downlink data is sent to the second UE, so that the second UE sends the downlink data to the first UE.

28 Claims, 7 Drawing Sheets

(51) Int. Cl.
    *H04W 88/04*     (2009.01)
    *H04B 7/026*     (2017.01)
    *H04W 36/30*     (2009.01)

(56) References Cited

U.S. PATENT DOCUMENTS

| | | | |
|---|---|---|---|
| 9,191,770 B2* | 11/2015 | Huang | H04L 1/0076 |
| 9,503,951 B2* | 11/2016 | Lei | H04W 76/023 |
| 2002/0065710 A1* | 5/2002 | Saito | G06Q 30/02 |
| | | | 709/202 |
| 2008/0221836 A1* | 9/2008 | Tateson | G01D 9/005 |
| | | | 702/188 |
| 2009/0122770 A1* | 5/2009 | Korakis | H04W 12/06 |
| | | | 370/338 |
| 2010/0302992 A1* | 12/2010 | Zhuang | H04W 40/04 |
| | | | 370/313 |
| 2011/0070833 A1 | 3/2011 | Perkins et al. | |
| 2011/0305164 A1* | 12/2011 | Zhang | H04B 7/024 |
| | | | 370/252 |
| 2012/0093098 A1* | 4/2012 | Charbit | H04W 72/04 |
| | | | 370/329 |
| 2012/0218886 A1* | 8/2012 | Van Phan | H04B 7/15592 |
| | | | 370/229 |
| 2012/0250545 A1 | 10/2012 | Papadogiannis et al. | |
| 2012/0289240 A1* | 11/2012 | Zirwas | H04W 24/00 |
| | | | 455/452.1 |
| 2013/0029589 A1* | 1/2013 | Bontu | H04W 16/14 |
| | | | 455/7 |
| 2013/0029680 A1* | 1/2013 | Park | H04W 72/0406 |
| | | | 455/450 |
| 2013/0064213 A1* | 3/2013 | Park | H04W 76/023 |
| | | | 370/329 |
| 2013/0107851 A1* | 5/2013 | Park | H04B 7/026 |
| | | | 370/329 |
| 2013/0235754 A1* | 9/2013 | Lim | H04W 72/042 |
| | | | 370/252 |
| 2013/0244661 A1* | 9/2013 | Lin | H04W 76/023 |
| | | | 455/436 |
| 2014/0241254 A1* | 8/2014 | Kaur | H04L 1/1812 |
| | | | 370/329 |
| 2014/0247802 A1* | 9/2014 | Wijting | H04W 76/023 |
| | | | 370/329 |
| 2014/0302793 A1 | 10/2014 | Ma et al. | |
| 2015/0063234 A1* | 3/2015 | Park | H04B 7/024 |
| | | | 370/329 |
| 2015/0382273 A1* | 12/2015 | Zhuang | H04W 40/04 |
| | | | 370/389 |

FOREIGN PATENT DOCUMENTS

| | | | |
|---|---|---|---|
| CN | 102404702 A | | 4/2012 |
| WO | 2006043903 A1 | | 4/2006 |
| WO | 2011007085 A1 | | 1/2011 |
| WO | 2011103719 A1 | | 9/2011 |
| WO | 2011150296 A1 | | 12/2011 |
| WO | WO 20120057547 | * | 5/2012 |
| WO | 2012102546 A2 | | 8/2012 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321, V10.5.0, Mar. 2012, 54 pages.

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.0.0, Jun. 2012, 302 pages.

* cited by examiner

```
When an access network device receives downlink data belonging to
a first user equipment UE, if it is determined that a supporting UE in
a support list of the first UE cannot serve as a current supporting UE      101
   of the downlink data, establish a cooperative communication
 relationship between a second UE and the first UE, that is, set the
 second UE as the current supporting UE of the first UE, where the
 second UE is another UE except the first UE and the supporting UE
                  in the support list of the first UE
```

```
                                                                            102
 Send the downlink data to the second UE, so that the second UE
             sends the downlink data to the first UE
```

FIG. 1

```
 A second user equipment UE receives downlink data that belongs to
  a first UE and is sent by an access network device, where when the
  access network device receives the downlink data belonging to the
  first UE, if it is determined that a supporting UE in a support list of    201
 the first UE cannot serve as a current supporting UE of the downlink
     data, a cooperative communication relationship is established
     between the second UE and the first UE, and the second UE is
  determined by the access network device as the current supporting
  UE of the first UE, where the second UE is another UE except the
    first UE and the supporting UE in the support list of the first UE
```

```
                                                                            202
            Send the downlink data to the first UE
```

COOPERATIVE COMMUNICATION METHOD AND SYSTEM, ACCESS NETWORK DEVICE, AND USER EQUIPMENT

This application is a continuation of International Application No. PCT/CN2012/080316, filed on Aug. 17, 2012, which is hereby incorporated by reference in its entirety.

TECHNICAL FIELD

The present invention relates to communications technologies, and in particular, to a cooperative communication method and system, an access network device, and a user equipment.

BACKGROUND

In existing synthesis communications, when a first user equipment (UE for short) uploads and downloads various kinds of data by means of a data communications service that is provided by a mobile communications system, reliability or a throughput rate of data transmission is sharply reduced due to deterioration of an environment of the first UE itself. Therefore, an access network device, such as an eNB that is a base station, may first send, to a current supporting UE of the first UE, data that is to be sent to the first UE, and then the current supporting UE forwards the data to the first UE by using a short-range communications technology between the current supporting UE and the first UE, so as to achieve an effect of multiuser diversity.

However, in the existing synthesis communications, after the access network device establishes a cooperative relationship between the first UE and the current supporting UE, when a status of a short-range link between the current supporting UE and the first UE becomes poor or a status of a macro network link between the current supporting UE and the access network device becomes poor, the reliability or the throughput rate of data transmission for the first UE is sharply reduced because a cooperative communication relationship between the first UE and the current supporting UE cannot be updated in the existing synthesis communications.

SUMMARY

Embodiments of the present invention provide a cooperative communication method and system, an access network device, and a user equipment, which can update a cooperative communication relationship between a first UE and a current supporting UE, and improve reliability of data transmission for the first UE.

According to a first aspect, an embodiment of the present invention provides a cooperative communication method, including: when an access network device receives downlink data belonging to a first user equipment UE, if it is determined that a supporting UE in a support list of the first UE cannot serve as a current supporting UE of the downlink data, establishing a cooperative communication relationship between a second UE and the first UE, that is, setting the second UE as the current supporting UE of the first UE, where the second UE is another UE except the first UE and the supporting UE in the support list of the first UE; and sending the downlink data to the second UE, so that the second UE sends the downlink data to the first UE.

In a first possible implementation manner, the establishing a cooperative communication relationship between a second UE and the first UE includes: receiving, by the access network device, synthesis request information that is sent by the second UE by using higher layer signaling, where the synthesis request information includes a pairing identifier, and the pairing identifier is a pairing identifier between the first UE and the second UE; saving the pairing identifier and an identifier of the second UE into the support list of the first UE and setting the second UE as the current supporting UE of the downlink data; sending synthesis establishment information to the second UE by using higher layer signaling, so that the second UE sets, according to the synthesis establishment information, a synthetic layer configuration corresponding to the first UE; and sending first synthesis update information to the first UE by using higher layer signaling, so that the first UE sets, according to the first synthesis update information, a synthetic layer configuration corresponding to the second UE.

In a second possible implementation manner, the establishing a cooperative communication relationship between a second UE and the first UE includes: sending, by the access network device, synthesis establishment information to the second UE by using higher layer signaling, so that the second UE sets, according to the synthesis establishment information, a synthetic layer configuration corresponding to the first UE; receiving, by using higher layer signaling, synthesis establishment response information returned by the second UE, where the synthesis establishment response information includes a pairing identifier, and the pairing identifier is a pairing identifier between the first UE and the second UE; saving the pairing identifier and an identifier of the second UE into the support list of the first UE and setting the second UE as the current supporting UE of the downlink data; and sending first synthesis update information to the first UE by using higher layer signaling, so that the first UE sets, according to the first synthesis update information, a synthetic layer configuration corresponding to the another UE.

Based on the first or second possible implementation manner, in a third possible implementation manner, the method further includes: receiving, by the access network device by using higher layer signaling, synthesis release request information sent by the second UE, where the synthesis release request information includes the pairing identifier between the first UE and the second UE; deleting the identifier of the second UE and the pairing identifier from the support list of the first UE; sending synthesis release response information to the second UE by using higher layer signaling, so that the second UE deletes the synthetic layer configuration corresponding to the first UE; and sending second synthesis update information to the first UE by using higher layer signaling, where the second synthesis update information includes the identifier of the second UE, so that the first UE deletes the synthetic layer configuration corresponding to the second UE.

Based on the first or second possible implementation manner, in a fourth possible implementation manner, the method further includes: deleting, by the access network device, the identifier of the second UE and the pairing identifier between the first UE and the second UE from the support list of the first UE if it is determined that the second UE is inappropriate to serve as a supporting UE of the first UE; sending synthesis deletion information to the second UE by using higher layer signaling, where the synthesis deletion information includes an identifier of the first UE, so that the second UE deletes the synthetic layer configuration corresponding to the first UE; and sending second synthesis update information to the first UE by using higher layer signaling, where the second synthesis update information includes the identifier of the second UE, so that the first UE deletes the synthetic layer configuration corresponding to the second UE.

Based on the fourth possible implementation manner, in a fifth possible implementation manner, the deleting, by the access network device, the identifier of the second UE and the pairing identifier between the first UE and the second UE from the support list of the first UE if it is determined that the second UE is inappropriate to serve as a supporting UE of the first UE specifically includes deleting, by the access network device, the identifier of the second UE and the pairing identifier between the first UE and the second UE from the support list of the first UE if it is determined that a time during which the second UE is inappropriate to serve as the supporting UE of the first UE is greater than a preset time threshold.

According to a second aspect, an embodiment of the present invention provides a cooperative communication method, including: receiving, by a second user equipment UE, downlink data that belongs to a first UE and is sent by an access network device, where when the access network device receives the downlink data belonging to the first UE, if it is determined that a supporting UE in a support list of the first UE cannot serve as a current supporting UE of the downlink data, a cooperative communication relationship is established between the second UE and the first UE, and the second UE is determined by the access network device as the current supporting UE of the first UE, where the second UE is another UE except the first UE and the supporting UE in the support list of the first UE; and sending the downlink data to the first UE.

In a first possible implementation manner, the method further includes: sending, by the second UE, synthesis request information to the access network device by using higher layer signaling, where the synthesis request information includes a pairing identifier, and the pairing identifier is a pairing identifier between the first UE and the second UE, so that the access network device saves the pairing identifier and an identifier of the second UE into the support list of the first UE, sets the second UE as the current supporting UE of the downlink data, and sends synthesis establishment information to the second UE by using higher layer signaling; and setting, according to the synthesis establishment information that is sent by the access network device by using the higher layer signaling, a synthetic layer configuration corresponding to the first UE.

In a second possible implementation manner, the method further includes: receiving, by the second UE, synthesis establishment information that is sent by the access network device by using higher layer signaling, and setting, according to the synthesis establishment information, a synthetic layer configuration corresponding to the first UE; and returning synthesis establishment response information to the access network device by using higher layer signaling, where the synthesis establishment response information includes a pairing identifier, and the pairing identifier is a pairing identifier between the first UE and the second UE, so that the access network device saves the pairing identifier and an identifier of the second UE into the support list of the first UE and sets the second UE as the current supporting UE of the downlink data.

Based on the first or second possible implementation manner, in a third possible implementation manner, the method further includes: sending, by the second UE, synthesis release request information to the access network device by using higher layer signaling, where the synthesis release request information includes the pairing identifier between the first UE and the second UE, so that the access network device deletes the identifier of the second UE and the pairing identifier from the support list of the first UE; and receiving synthesis release response information that is returned by the access network device by using higher layer signaling, and deleting the synthetic layer configuration corresponding to the first UE.

Based on the first or second possible implementation manner, in a fourth possible implementation manner, the method further includes: receiving, by the second UE by using higher layer signaling, synthesis deletion information sent by the access network device, where the synthesis deletion information includes an identifier of the first UE, and the synthesis deletion information is synthesis deletion information that is sent to the second UE after the access network device determines that the second UE is inappropriate to serve as a supporting UE of the first UE and deletes the identifier of the second UE and the pairing identifier between the first UE and the second UE from the support list of the first UE; and deleting the synthetic layer configuration corresponding to the first UE.

According to a third aspect, an embodiment of the present invention provides an access network device, including: a determining module, configured to, when downlink data belonging to a first user equipment UE is received, if it is determined that a supporting UE in a support list of the first UE cannot serve as a current supporting UE of the downlink data, establish a cooperative communication relationship between a second UE and the first UE, that is, set the second UE as the current supporting UE of the first UE, where the second UE is another UE except the first UE and the supporting UE in the support list of the first UE; and a first sending module, configured to, on the basis that the determining module sets the second UE as the current supporting UE of the first UE, send the downlink data to the second UE, so that the second UE sends the downlink data to the first UE.

According to a fourth aspect, an embodiment of the present invention provides a user equipment, including: a second receiving module, configured to receive downlink data that belongs to a first UE and is sent by an access network device, where when the access network device receives the downlink data belonging to the first UE, if it is determined that a supporting UE in a support list of the first UE cannot serve as a current supporting UE of the downlink data, a cooperative communication relationship is established between a second UE and the first UE, and the second UE is determined by the access network device as the current supporting UE of the first UE, where the second UE is another UE except the first UE and the supporting UE in the support list of the first UE; and a second sending module, configured to send, to the first UE, the downlink data received by the second receiving module.

According to a fifth aspect, an embodiment of the present invention provides a cooperative communication system, including the foregoing access network device and the user equipment, where the system includes at least one user equipment.

It can be learned from the foregoing technical solutions that, in the embodiments of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in the embodiments of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a schematic flowchart of a cooperative communication method according to an embodiment of the present invention;

FIG. 2 is a schematic flowchart of a cooperative communication method according to another embodiment of the present invention;

DETAILED DESCRIPTION OF ILLUSTRATIVE EMBODIMENTS

Figure 3:
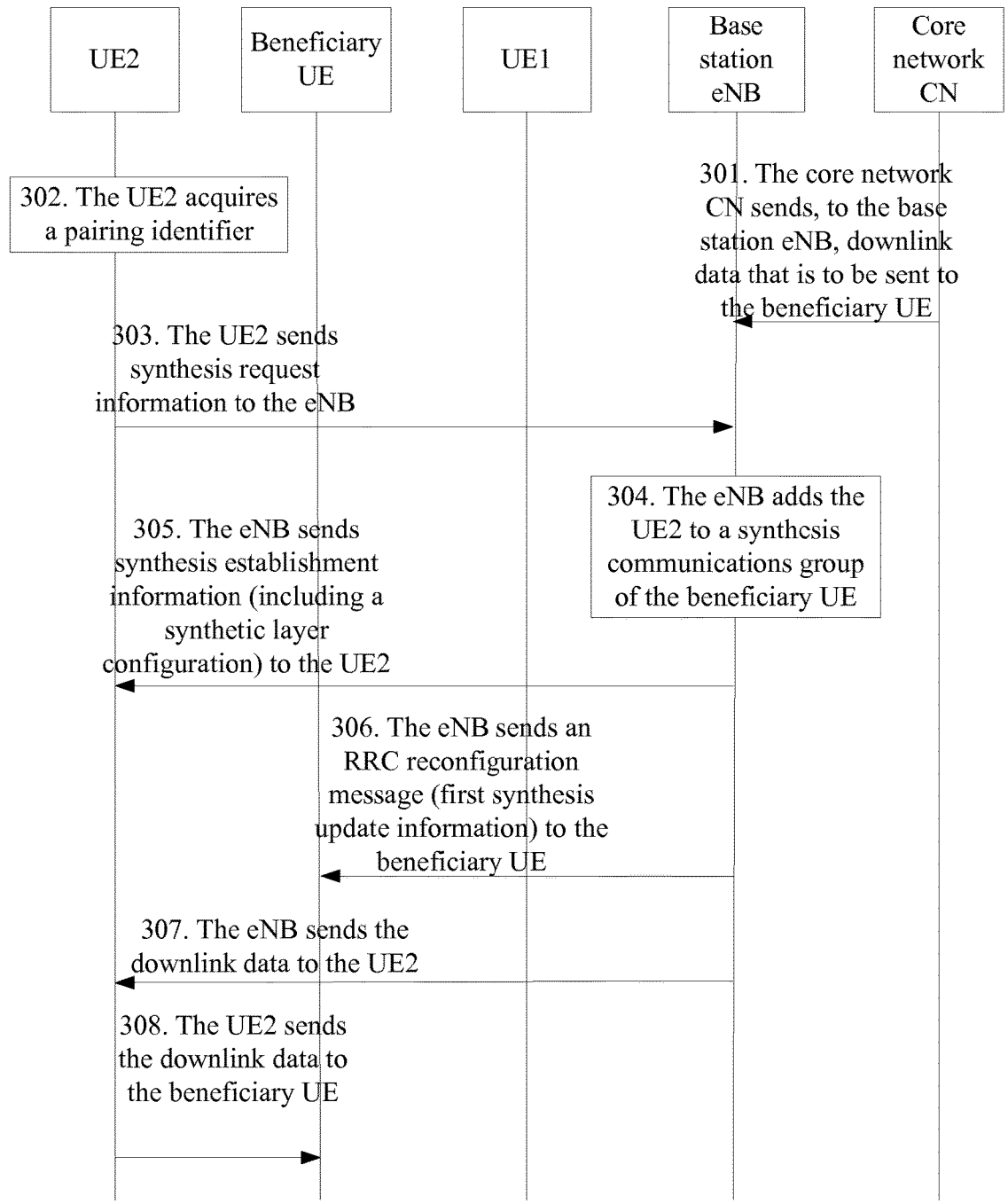
FIG. 3 is a schematic diagram of signaling of a cooperative communication method according to another embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

The technical solutions provided in the present invention may be applied to various wireless communications systems, for example, a Global System for Mobile Communications (GSM for short), a general packet radio service (GPRS for short) system, a Code Division Multiple Access (CDMA for short) system, a CDMA2000 system, a Wideband Code Division Multiple Access (WCDMA for short) system, a Long Term Evolution (LTE for short) system or a Worldwide Interoperability for Microwave Access (WiMAX for short) system.

It should be noted that, an access network device in the following description may be a base station controller (BSC for short) in a GSM system, GPRS system or CDMA system, may be a radio network controller (RNC for short) in a CDMA2000 system or WCDMA system, may be an evolved NodeB (eNB for short) in an LTE system, or may be a network element such as an access service network base station (ASN BS for short) in a WiMAX network.

It should be noted that, a first UE in the following description includes the first UE, a second UE is any other UE except the first UE and a supporting UE in a support list of the first UE.

FIG. 1 is a schematic flowchart of a cooperative communication method according to an embodiment of the present invention. As shown in FIG. 1, a cooperative relationship processing method in this embodiment may include the following steps.

101. When an access network device receives downlink data belonging to a first user equipment UE, if it is determined that a supporting UE in a support list of the first UE cannot serve as a current supporting UE of the downlink data, establish a cooperative communication relationship between a second UE and the first UE, that is, set the second UE as the current supporting UE of the first UE, where the second UE is another UE except the first UE and the supporting UE in the support list of the first UE.

In an optional implementation manner of the present invention, when the access network device receives the downlink data belonging to the first user equipment UE, if it is determined that the supporting UE in the support list of the first UE cannot serve as the current supporting UE of the downlink data, specific implementation may be as follows. The access network device may acquire an identifier of the supporting UE in the support list of the first UE. It should be noted that, the supporting UE in the support list of the first UE includes at least one supporting UE, or may include multiple supporting UEs. The access network device acquires, according to an identifier of each supporting UE, channel quality information of a supporting UE corresponding to the identifier of each supporting UE. It should be noted that, the channel quality information includes but is not limited to status information of a short-range link between the supporting UE and the first UE, or status information of a macro network link between the supporting UE and the access network device; if channel quality information of each supporting UE included in the support list of the first UE is poor, it may be determined that the supporting UE in the support list of the first UE cannot serve as the current supporting UE of the downlink data.

To ensure reliability of data transmission for the first UE, the access network device may establish the cooperative communication relationship between the second UE and the first UE, that is, set the second UE as the current supporting UE of the first UE, which in specific implementation may be as follows.

In an optional implementation manner of the present invention, the access network device may receive synthesis request information that is sent by the second UE by using higher layer signaling, where the synthesis request information includes a pairing identifier, and the pairing identifier is a pairing identifier between the first UE and the second UE; save the pairing identifier and an identifier of the second UE into the support list of the first UE, and set the second UE as the current supporting UE of the downlink data; send synthesis establishment information to the second UE by using higher layer signaling, so that the second UE sets, according to the synthesis establishment information, a synthetic layer configuration corresponding to the first UE; and send first synthesis update information to the first UE by using higher layer signaling, so that the first UE sets, according to the first synthesis update information, a synthetic layer configuration corresponding to the second UE.

In an optional implementation manner of the present invention, the access network device sends the synthesis establishment information to the second UE by using the higher layer signaling, so that the second UE sets, according to the synthesis establishment information, the synthetic layer configuration corresponding to the first UE, which in specific implementation may be as follows. After receiving the synthesis establishment information, the second UE may start detecting channel quality of a short-range link between the second UE and the first UE, or may query capability information of the second UE. It should be noted that, the second UE may display the synthesis establishment information in a user interface of the second UE, so that a user decides whether the second UE serves as a supporting UE of the first UE. If the user decides that the second UE does not serve as the supporting UE of the first UE, or subscription information or capability information of the second UE itself does not support synthesis communications, or quality of the short-range link between the second UE and the first UE cannot satisfy a requirement, the second UE may not send synthesis establishment response information to the access network device, or may send support refusing information to the access network device according to a user instruction by using higher layer signaling; if the user decides that the second UE serves as the supporting UE of the first UE, or items that need to be checked and confirmed, such as subscription information, UE capability, and quality of the short-range link, all satisfy a requirement for synthesis communications, the second UE may set, according to the synthesis establishment information, the synthetic layer configuration corresponding to the first UE, and send synthesis establishment response information to the access network device by using higher layer signaling, where the synthesis establishment response information includes a pairing identifier, and the pairing identifier is a pairing identifier between the first UE and the second UE.

The access network device receives, by using higher layer signaling, the synthesis establishment response information returned by the second UE, and may save an identifier of the second UE and the pairing identifier between the first UE and the second UE into the support list of the first UE, and set the second UE as the current supporting UE of the downlink data; and further, the access network device may send first synthesis update information to the first UE by using higher layer signaling, so that the first UE sets, according to the first synthesis update information, a synthetic layer configuration corresponding to the second UE.

It should be noted that, the foregoing pairing identifier between the first UE and the second UE may be a random number that has been negotiated between the second UE and the first UE, may be an identifier of the first UE, or may be a random number that has been negotiated between the first UE and the supporting UE in the support list of the first UE, which is not limited in the present invention.

Further, the synthesis request information may further include radio bearer information, for example, before the second UE sends the synthesis request information, if the second UE learns a current radio bearer situation of the first UE, the second UE may add, to a synthesis request, information indicating which radio bearer is requested to be supported, that is, the second UE may add, to the synthesis request information, radio bearer information that is requested to be supported by the first UE, and the access network device may save, into an entry that is in the support list of the first UE and corresponds to the identifier of the second UE, radio bearer information that is requested to be supported by the second UE.

It should be noted that, the foregoing synthesis establishment information includes but is not limited to at least one of the following synthetic layer configurations: the Radio Link Control (RLC) protocol, a Media Access Control (MAC) address of the first UE, and a physical layer PHY address of the first UE.

The foregoing first synthesis update information includes but is not limited to information indicating that the second UE is added to the support list of the first UE, so that the first UE sets the synthetic layer configuration corresponding to the second UE.

In an optional implementation manner of this embodiment, for example, for the higher layer signaling, the foregoing synthesis request information, synthesis establishment information, synthesis establishment response information or first synthesis update information may be specifically carried by using an information element (IE for short) in a radio resource control (RRC for short) message. The RRC message may be an RRC message in the prior art, such as an RRC connection reconfiguration message, or the RRC message may be different from an existing RRC message in the prior art, which is not limited in this embodiment.

For another example, for the higher layer signaling, the foregoing synthesis request information, synthesis establishment information, synthesis establishment response information or first synthesis update information may also be specifically carried by using a newly added Media Access Control (MAC for short) control element (CE for short) message.

In an optional implementation manner of the present invention, when the second UE does not want to serve as the supporting UE of the first UE, the access network device may further receive, by using higher layer signaling, synthesis release request information sent by the second UE, where the synthesis release request information includes the identifier of the first UE; the access network device performs searching in the support list of the first UE according to the identifier of the first UE, and deletes the identifier of the second UE and the pairing identifier between the second UE and the first UE from the support list of the first UE; the access network device may send synthesis release response information to the second UE by using higher layer signaling, so that the second UE deletes the synthetic layer configuration corresponding to the first UE; and the access network device may send second synthesis update information to the first UE by using higher layer signaling, where the second synthesis update information includes the identifier of the second UE, so that the first UE deletes the synthetic layer configuration corresponding to the second UE.

In an optional implementation manner of the present invention, if the access network device determines that the second UE is inappropriate to serve as the supporting UE of the first UE, for example, by using measurement reporting information sent by the first UE to the access network device or measurement reporting information sent by the second UE to the access network device, where the measurement reporting information includes status information of a short-range link between the second UE and the first UE, or status information of a macro network link between the second UE and the access network, the access network device may independently determine, according to the measurement reporting information, or according to information such as a scheduling policy, or when the access network device determines that a service volume of the first UE decreases and support from the second UE is no longer required, whether to switch the second UE or delete a synthesis bearer of the second UE, and if the access network device determines to delete the synthesis bearer of the second UE, may delete the identifier of the second UE from the support list of the first UE; send synthesis deletion information to the second UE by using higher layer signaling, where the synthesis deletion information includes the identifier of the first UE, so that the second UE deletes the synthetic layer configuration corresponding to the first UE; and send second synthesis update information to the first UE by using higher layer signaling, where the second synthesis update information includes the identifier of the second UE, so that the first UE deletes the synthetic layer configuration corresponding to the second UE.

In an optional implementation manner of the present invention, to reduce a signaling overhead resulting from frequent establishment or deletion of a synthetic layer configuration by the access network device, the access network device deletes the identifier of the second UE from the support list of the first UE if the access network device determines that the second UE is inappropriate to serve as the supporting UE of the first UE, which in specific implementation may be as follows. The access network device deletes the identifier of the second UE from the support list of the first UE if the access network device determines that a time during which the second UE is inappropriate to serve as the supporting UE of the first UE is greater than a preset time threshold. For example, because a condition of a short-range channel of the second UE becomes poor or a location becomes far or another situation occurs, before deleting the synthesis bearer of the second UE, the access network device may enable a timer or a counter to count whether link deterioration times is greater than a time threshold or a times threshold. Before the timer expires or the counter exceeds the maximum number of times, the access network device temporarily does not delete the synthesis bearer of the second UE, but first adjusts a scheduling policy (that is, temporarily does not schedule the second UE as the current supporting UE of the first UE), and then waits for recovery of quality of the short-range channel, and if the quality of the short-range channel recovers, adjusts the scheduling policy to its original status. If the time expires or the counter exceeds the maximum number of times, the access network device deletes the synthesis bearer of the second UE for the first UE and updates the synthetic layer configuration for the first UE.

102. Send the downlink data to the second UE, so that the second UE sends the downlink data to the first UE.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

FIG. 2 is a schematic flowchart of a cooperative communication method according to another embodiment of the present invention. As shown in FIG. 2, the method includes the following steps.

201. A second user equipment UE receives downlink data that belongs to a first UE and is sent by an access network device, where when the access network device receives the downlink data belonging to the first UE, if it is determined that a supporting UE in a support list of the first UE cannot serve as a current supporting UE of the downlink data, a cooperative communication relationship is established between the second UE and the first UE, and the second UE is determined by the access network device as the current supporting UE of the first UE, where the second UE is another UE except the first UE and the supporting UE in the support list of the first UE.

It should be noted that, when receiving the downlink data belonging to the first UE, the access network device may query channel quality information of the supporting UE in the support list of the first UE, where the supporting UE in the support list of the first UE includes at least one supporting UE, or may include multiple supporting UEs; the channel quality information includes but is not limited to status information of a short-range link between the second UE and the first UE or status information of a macro network link between the second UE and the access network device; it is assumed that channel quality information of each supporting UE in the support list of the first UE is poor, to ensure reliability of data transmission for the first UE, the access network device may establish a cooperative communication relationship between the second UE and the first UE, and set the second UE as the current supporting UE of the first UE, where the second UE is any other UE except the first UE and the supporting UE in the support list of the first UE, which in specific implementation may be as follows.

In an optional implement manner of the present invention, the second UE sends synthesis request information to the access network device by using higher layer signaling, where the synthesis request information includes a pairing identifier, and the pairing identifier is a pairing identifier between the first UE and the second UE, so that the access network device saves the pairing identifier and an identifier of the second UE into the support list of the first UE, sets the second UE as the current supporting UE of the downlink data, and sends synthesis establishment information to the second UE by using higher layer signaling; and the second UE sets, according to the synthesis establishment information that is sent by the access network device by using the higher layer signaling, a synthetic layer configuration corresponding to the first UE.

In an optional implementation manner of the present invention, the second UE receives the synthesis establishment information that is sent by the access network device by using the higher layer signaling, and may start detecting channel quality of a short-range link between the second UE and the first UE, or may query capability information of the second UE. It should be noted that, the second UE may display the synthesis establishment information in a user interface of the second UE, so that a user decides whether the second UE serves as a supporting UE of the first UE. If the user decides that the second UE does not serve as the supporting UE of the first UE, or subscription information or capability information of the second UE does not support synthesis communications, or quality of the short-range link between the second UE and the first UE cannot satisfy a requirement, the second UE may not send synthesis establishment response information to the access network device, or may send support refusing information to the access network device according to a user instruction by using higher layer signaling; if the user decides that the second UE serves as the supporting UE of the first UE, or items that need to be checked and confirmed, such as subscription information, UE capability, and quality of the short-range link, all satisfy a requirement for synthesis communications, the second UE may set, according to the synthesis establishment information, the synthetic layer configuration corresponding to the first UE, and send synthesis establishment response information to the access network device by using higher layer signaling, where the synthesis establishment response information includes a pairing identifier, and the pairing identifier is a pairing identifier between the first UE and the second UE, so that the access network device saves the pairing identifier and the identifier of the second UE into the support list of the first UE and sets the second UE as the current supporting UE of the downlink data.

It should be noted that, the foregoing pairing identifier between the first UE and the second UE may be a random number that has been negotiated between the second UE and the first UE, may be an identifier of the first UE, or may be a random number that has been negotiated between the first UE and the supporting UE in the support list of the first UE, which is not limited in the present invention.

Further, the synthesis request information may further include radio bearer information, for example, before the second UE sends the synthesis request information, if the second UE learns a current radio bearer situation of the first UE, the second UE may add, to a synthesis request, information indicating which radio bearer is requested to be supported, that is, the second UE may add, to the synthesis request information, radio bearer information that is requested to be supported by the first UE, and the access network device may save, into an entry that is in the support list of the first UE and corresponds to the identifier of the second UE, radio bearer information that is requested to be supported by the second UE.

It should be noted that, the foregoing synthesis establishment information includes but is not limited to at least one of the following synthetic layer configurations: the Radio Link Control (Radio Link Control, RLC) protocol, a Media Access Control (Medium/Media Access Control, MAC) address of the first UE, and a physical layer PHY address of the first UE.

In an optional implementation manner of the present invention, for example, for the higher layer signaling, the foregoing synthesis request information, synthesis establishment information, synthesis establishment response information or first synthesis update information may be specifically carried by using an information element (Information Element, IE for short) in a radio resource control (Radio Resource Control, RRC for short) message. The RRC message may be an RRC message in the prior art, such as an RRC connection reconfiguration message, or the RRC message may be different from an existing RRC message in the prior art, which is not limited in this embodiment.

For another example, for the higher layer signaling, the foregoing synthesis request information, synthesis establishment information, synthesis establishment response information or first synthesis update information may also be specifically carried by using a newly added Media Access Control (Media Access Control, MAC for short) control element (Control Element, CE for short) message.

In an optional implementation manner of the present invention, when the second UE does not want to serve as the supporting UE of the first UE, the second UE may actively send synthesis release request information to the access network device by using higher layer signaling, where the synthesis release request information includes the pairing identifier between the first UE and the second UE, so that the access network device deletes the identifier of the second UE and the pairing identifier between the first UE and the second UE from the support list of the first UE, and sends synthesis release response information to the second UE by using higher layer signaling; and the second UE may delete, according to the synthesis release response information, the synthetic layer configuration corresponding to the first UE.

In an optional implementation manner of the present invention, if the access network device determines that the second UE is inappropriate to serve as the supporting UE of the first UE, for example, by using measurement reporting information sent by the first UE to the access network device or measurement reporting information sent by the second UE to the access network device, where the measurement reporting information includes status information of a short-range link between the second UE and the first UE, or status information of a macro network link between the second UE and the access network, the access network device may independently determine, according to the measurement reporting information, or according to information such as a scheduling policy, or when the access network device determines that a service volume of the first UE decreases and support from the second UE is no longer required, whether to switch the second UE or delete a synthesis bearer of the second UE, and if the access network device determines to delete the synthesis bearer of the second UE, may delete the identifier of the second UE and the pairing identifier between the first UE and the second UE from the support list of the first UE; and send synthesis deletion information to the second UE by using higher layer signaling, where the synthesis deletion information includes the identifier of the first UE; and the second UE deletes, according to the synthetic deletion information, the synthetic layer configuration corresponding to the first UE.

202. Send the downlink data to the first UE.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

It should be noted that, for ease of description, the foregoing method embodiment is described as a combination of a series of actions; however, persons skilled in the art should know that, the present invention is not limited by the described action sequence, because some steps may be performed in another sequence or simultaneously according to the present invention. In addition, persons skilled in the art should also know that the embodiments described in the specification are all exemplary embodiments, and the involved actions and modules are not definitely required in the present invention.

In the foregoing embodiments, the description of each embodiment has different emphasis; for a part that is not detailed in an embodiment, reference may be made to related description in another embodiment.

It should be noted that, a beneficiary UE in the following description is the first UE described in the embodiment shown in FIG. 1 or FIG. 2, A UE2 is the second UE (a newly added supporting UE) described in the embodiment shown in FIG. 1 or FIG. 2, that is, any other UE except the beneficiary UE and a supporting UE in a support list of the beneficiary UE; and a UE1 is any supporting UE in the support list of the beneficiary UE, where the support list of the beneficiary UE may include another supporting UE in addition to the UE1, and a base station eNB is one kind of the access network devices described in the embodiments shown in FIG. 1 and FIG. 2.

FIG. 3 is a schematic diagram of signaling of a cooperative communication method according to another embodiment of the present invention. As shown in FIG. 3, the method includes the following steps.

301. A core network CN sends, to a base station eNB, downlink data that is to be sent to a beneficiary UE.

The base station eNB queries a support list of the beneficiary UE; if the support list of the beneficiary UE includes a supporting UE1, and the UE1 cannot serve as a current supporting UE of the downlink data because current channel quality information of the UE1 is poor, to ensure reliability of data transmission for the beneficiary UE, the base station eNB needs to update a supporting UE in the support list of the beneficiary UE in time.

302. A UE2 acquires a pairing identifier.

It should be noted that, the foregoing pairing identifier is a pairing identifier between the beneficiary UE and the UE2, where the pairing identifier may be a random number that has been negotiated between the UE2 and the beneficiary UE, may be an identifier of the beneficiary UE, or may be a random number that has been negotiated between the beneficiary UE and the supporting UE1.

303. The UE2 sends synthesis request information to the eNB.

In specific implementation, the UE2 may send the synthesis request information to the base station eNB by using higher layer signaling, where the synthesis request information includes the pairing identifier acquired by the foregoing UE2.

304. The eNB adds the UE2 to a synthesis communications group of the beneficiary UE.

In specific implementation, if the eNB determines that the UE2 can serve as a supporting UE of the beneficiary UE, the eNB may add an identifier of the UE2 and the pairing identifier between the UE2 and the beneficiary UE to the support list of the beneficiary UE, and set the UE2 as a current supporting UE of the beneficiary UE.

305. The eNB sends synthesis establishment information (including a synthetic layer configuration) to the UE2.

Specifically, the base station eNB may send the synthesis establishment information to the UE2 by using higher layer signaling, where the synthesis establishment information includes the synthetic layer configuration, so that the UE2 establishes, according to the synthetic layer configuration, synthetic layer configuration information corresponding to the beneficiary UE.

The foregoing synthetic layer configuration includes but is not limited to at least one of the following items: the Radio Link Control (Radio Link Control, RLC) protocol, a MAC address of the beneficiary UE, a physical layer PHY address of the beneficiary UE, and the like.

306. The eNB sends an RRC reconfiguration message (first synthesis update information) to the beneficiary UE.

Specifically, the base station eNB may send higher layer signaling such as the RRC reconfiguration message to the beneficiary UE, where the RRC reconfiguration message carries the first synthesis update information, and the first synthesis update information includes but is not limited to information indicating that the UE2 is added to the synthesis communications group of the beneficiary UE, so that the beneficiary UE establishes, according to the first synthesis update information, a synthetic layer configuration corresponding to the UE2.

307. The eNB sends the downlink data to the UE2.

308. The UE2 sends the downlink data to the beneficiary UE.

In this embodiment of the present invention, a UE2 actively sends synthesis request information to a base station, so that the base station establishes a cooperative communication relationship between the UE2 and a beneficiary UE, and adds the UE2 to a synthesis communications group of the beneficiary UE, and therefore, when a current supporting UE1 of the beneficiary UE cannot bear downlink data, the newly added supporting UE2 may be set as a current supporting UE of the beneficiary UE, thereby improving reliability of data transmission for the beneficiary UE.

Figure 4:
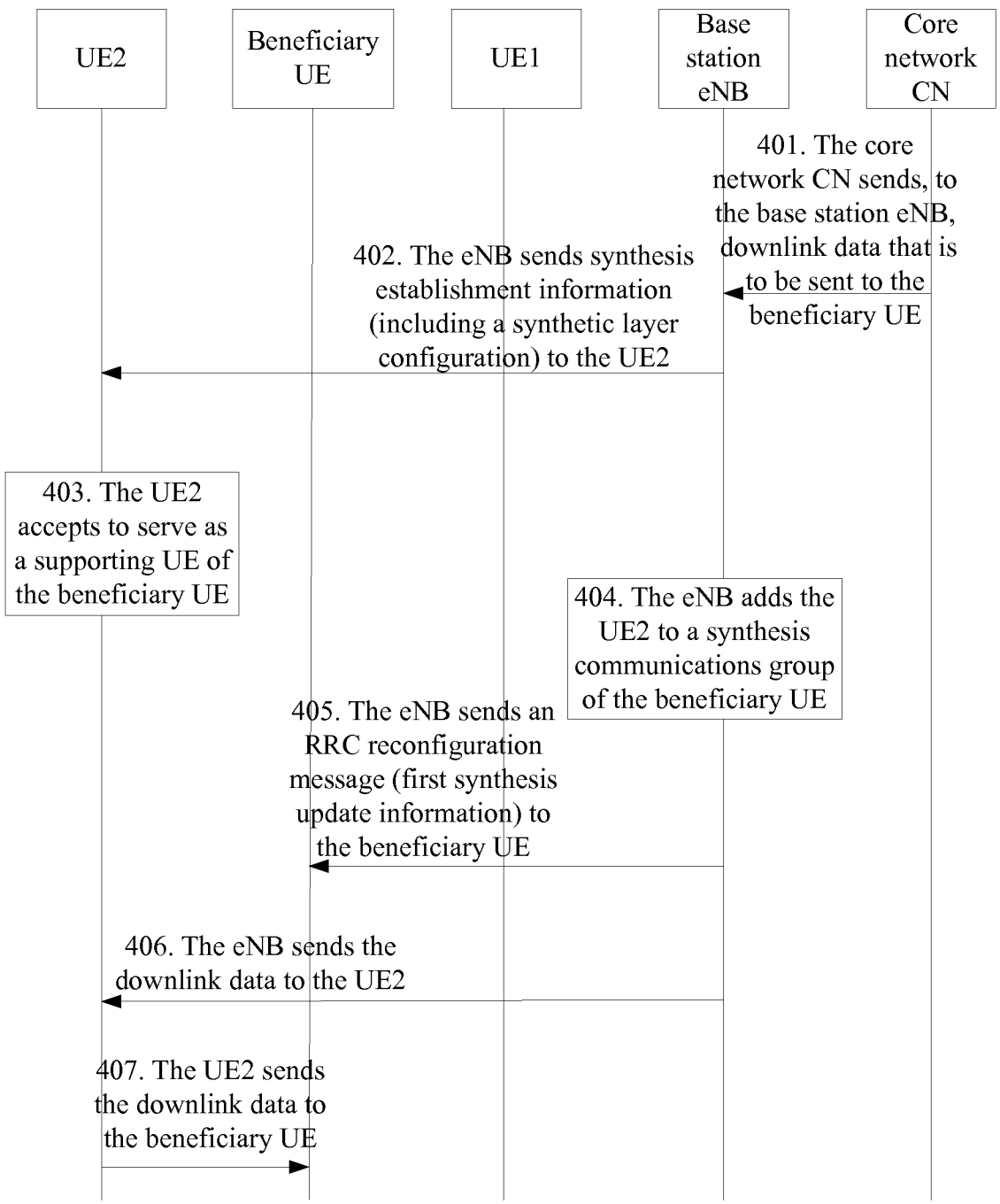
FIG. 4 is a schematic diagram of signaling of a cooperative communication method according to another embodiment of the present invention.

FIG. 4 is a schematic diagram of signaling of a cooperative communication method according to another embodiment of the present invention. As shown in FIG. 4, the method includes the following steps.

401. A core network CN sends, to a base station eNB, downlink data that is to be sent to a beneficiary UE.

The base station eNB queries a support list of the beneficiary UE; if the support list of the beneficiary UE includes a supporting UE1, and the UE1 cannot serve as a current supporting UE of the downlink data because current channel quality information of the UE1 is poor, to ensure reliability of data transmission for the beneficiary UE, the base station eNB needs to update a supporting UE in the support list of the beneficiary UE in time.

402. The eNB sends synthesis establishment information (including a synthetic layer configuration) to a UE2.

Specifically, the base station eNB sends the synthesis establishment information to the UE2 by using higher layer signaling, where the synthesis establishment information may include the synthetic layer configuration, for example, the synthetic layer configuration includes but is not limited to at least one of the following items: the Radio Link Control (Radio Link Control, RLC) protocol, a MAC address of the beneficiary UE, and a physical layer PHY address of the beneficiary UE.

403. The UE2 accepts to serve as a supporting UE of the beneficiary UE.

Specifically, after the UE2 detects channel quality of a short-range link between the UE2 and the beneficiary UE, or queries capability information of the UE2, if the UE2 accepts to serve as the supporting UE of the beneficiary UE, the UE2 may set, according to synthetic layer configuration information included in the synthetic layer configuration, a synthetic layer configuration corresponding to the beneficiary UE, establish a cooperative communication relationship between the UE2 and the beneficiary UE, and send synthesis establishment response information to the eNB by using higher layer signaling, where the synthesis establishment response information includes a pairing identifier between the UE2 and the beneficiary UE.

Optionally, if the UE2 refuses to serve as the supporting UE of the beneficiary UE, the UE2 sends support refusing information to the eNB by using higher layer signaling, or does not send synthesis establishment response information to the eNB.

404. The eNB adds the UE2 to a synthesis communications group of the beneficiary UE.

In specific implementation, the eNB may add an identifier of the UE2 and the pairing identifier between the UE2 and the beneficiary UE to the support list of the beneficiary UE, and set the UE2 as a current supporting UE of the beneficiary UE.

405. The eNB sends an RRC reconfiguration message (first synthesis update information) to the beneficiary UE.

Specifically, the base station eNB may send higher layer signaling such as the RRC reconfiguration message to the beneficiary UE, where the RRC reconfiguration message carries the first synthesis update information, and the first synthesis update information includes but is not limited to information indicating that the UE2 is added to the synthesis communications group of the beneficiary UE, so that the beneficiary UE establishes, according to the first synthesis update information, synthetic layer configuration information corresponding to the supporting UE2.

406. The eNB sends the downlink data to the UE2.

407. The UE2 sends the downlink data to the beneficiary UE.

In this embodiment of the present invention, after detecting that a UE2 can serve as a supporting UE of a beneficiary UE, a base station sends synthesis establishment information to the UE2, and after the UE2 accepts to serve as the supporting UE of the beneficiary UE, establishes a cooperative communication relationship between the UE2 and the beneficiary UE, and adds the UE2 to a synthesis communications group of the beneficiary UE, and therefore, when a current supporting UE1 of the beneficiary UE cannot bear downlink data, the newly added supporting UE2 may be set as a current supporting UE of the beneficiary UE, thereby improving reliability of data transmission for the beneficiary UE.

Figure 5:
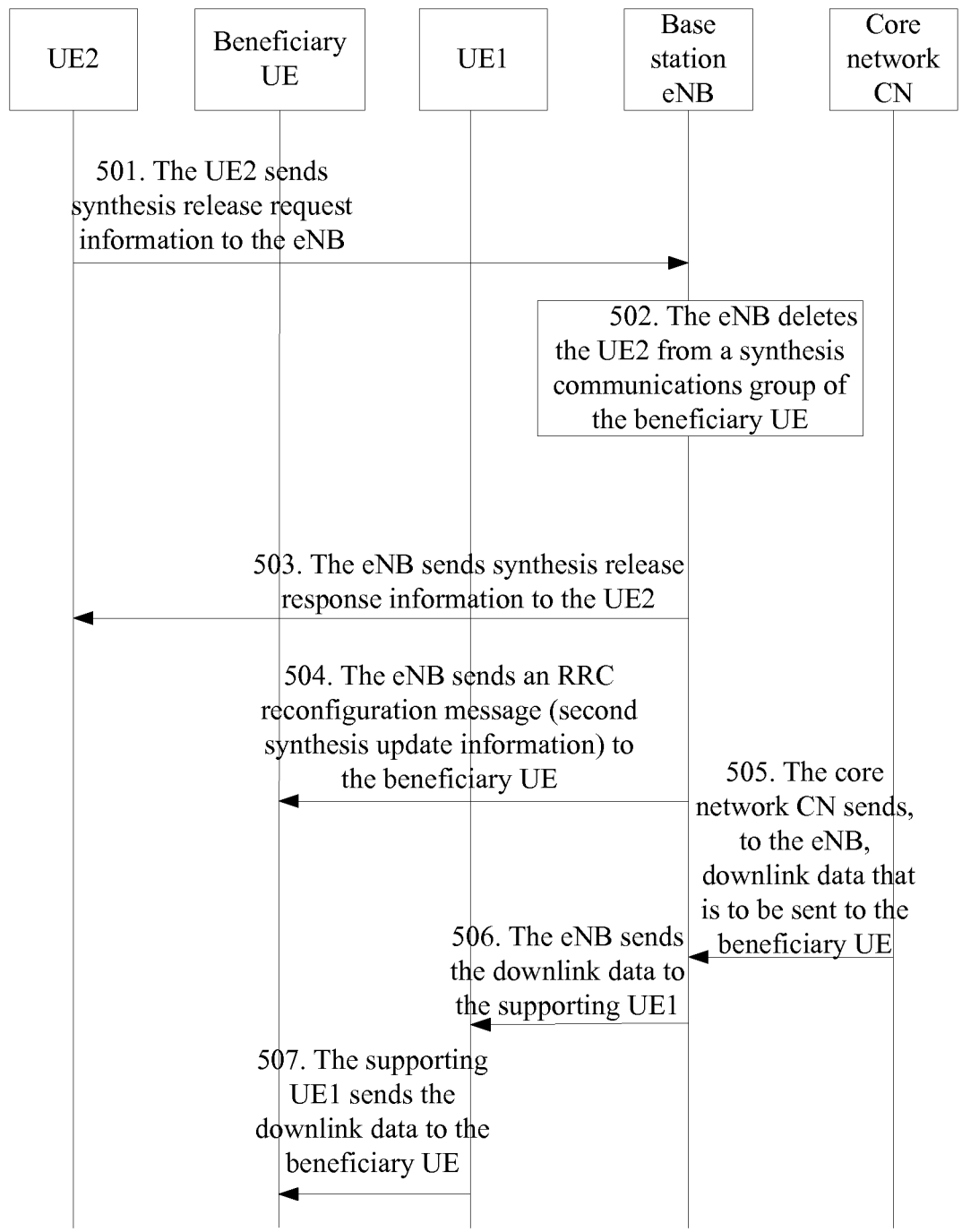
FIG. 5 is a schematic diagram of signaling of a cooperative communication method according to another embodiment of the present invention.

FIG. 5 is a schematic diagram of signaling of a cooperative communication method according to another embodiment of the present invention. As shown in FIG. 5, the method includes the following steps.

501. A UE2 sends synthesis release request information to an eNB.

In this embodiment, when a supporting UE2 does not want to serve as a supporting UE of a beneficiary UE, the supporting UE2 may send the synthesis release request information to the eNB by using higher layer signaling.

502. The eNB deletes the UE2 from a synthesis communications group of a beneficiary UE.

In specific implementation, the eNB deletes an identifier of the UE2 and a pairing identifier between the UE2 and the beneficiary UE from a support list.

503. The eNB sends synthesis release response information to the UE2.

In specific implementation, the eNB sends the synthesis release response information to the UE2 by using higher layer signaling, so that the UE2 deletes a synthetic layer configuration corresponding to the beneficiary UE.

504. The eNB sends an RRC reconfiguration message (second synthesis update information) to the beneficiary UE.

In specific implementation, the eNB sends the second synthesis update information to the beneficiary UE by using higher layer signaling such as the RRC reconfiguration message, where the second synthesis update information includes information indicating that the UE2 exits from the synthesis communications group of the beneficiary UE, so that the beneficiary UE deletes a synthetic layer configuration corresponding to the UE2.

505. A core network CN sends, to the eNB, downlink data that is to be sent to the beneficiary UE.

506. The eNB sends the downlink data to a supporting UE1.

For example, the base station eNB may acquire channel quality information of each supporting UE in the support list of the beneficiary UE. If channel quality information of the supporting UE1 is the best, the base station eNB sets the supporting UE1 as a current supporting UE of the beneficiary UE and sends the downlink data to the supporting UE1.

507. The supporting UE1 sends the downlink data to the beneficiary UE.

In this embodiment of the present invention, a UE2 actively sends synthesis release request information to a base station, so that the base station deletes the UE2 from a synthesis communications group of a beneficiary UE, and therefore, a synthetic layer configuration that cannot serve as a supporting UE of the beneficiary UE may be released in time and a cooperative relationship between the beneficiary UE and the supporting UE can be updated in time, thereby improving reliability of data transmission for the beneficiary UE.

Figure 6:
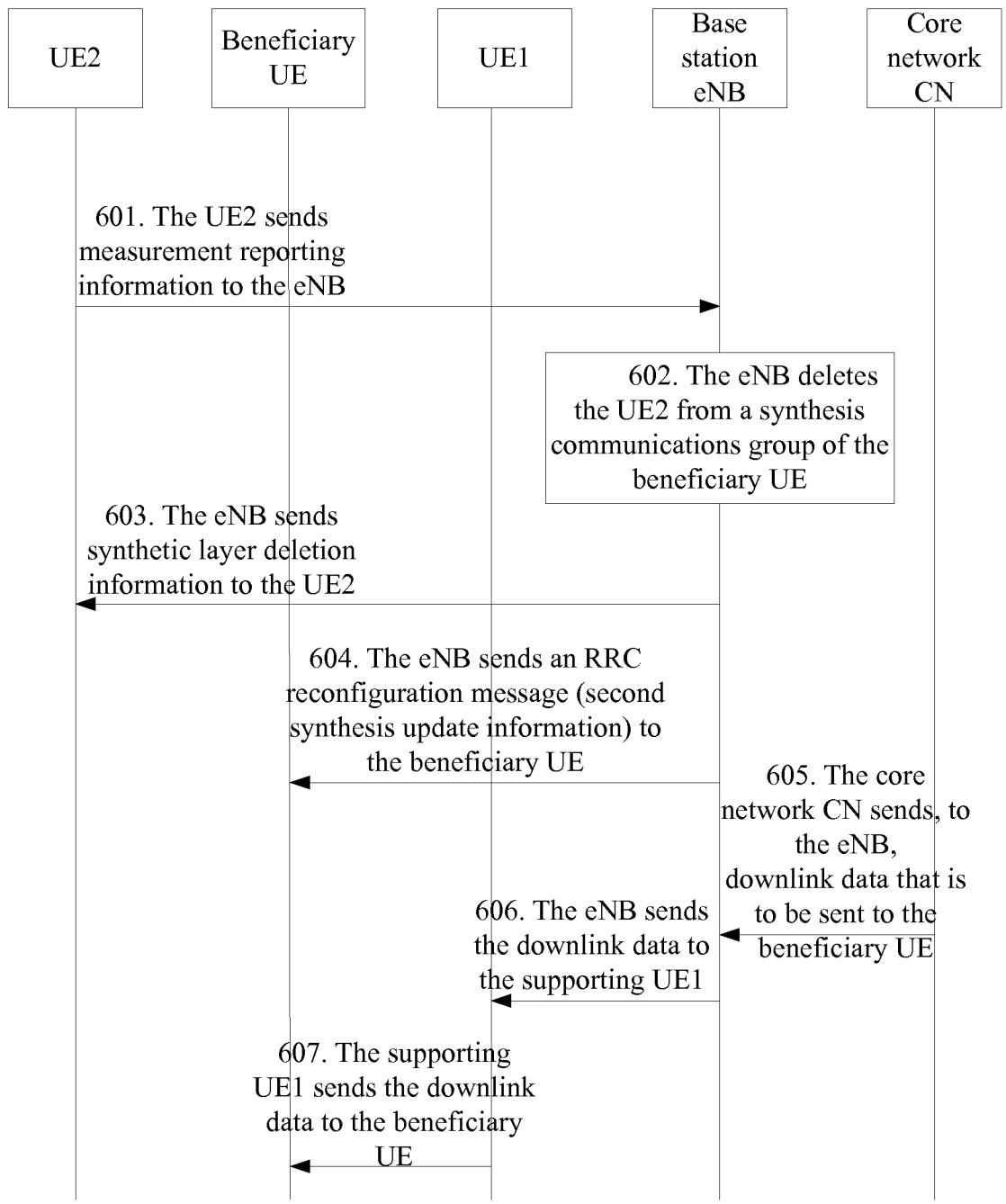
FIG. 6 is a schematic diagram of signaling of a cooperative communication method according to another embodiment of the present invention.

FIG. 6 is a schematic diagram of signaling of a cooperative communication method according to another embodiment of the present invention. As shown in FIG. 6, the method includes the following steps.

601. A UE2 sends measurement reporting information to an eNB.

In specific implementation, the UE2 sends the measurement reporting information to the eNB by using higher layer signaling, where the measurement reporting information includes status information of a short-range link between the UE2 and a beneficiary UE, or status information of a macro network link between the UE2 and the base station eNB.

602. The eNB deletes the UE2 from a synthesis communications group of a beneficiary UE.

For example, when determining, according to the measurement reporting information sent by the UE2, that a status of the short-range link between the UE2 and the beneficiary UE is poor, the base station eNB may temporarily not schedule the UE2 as a current supporting UE of the beneficiary UE, but wait for recovery of quality of a short-range channel; and if the quality of the short-range channel recovers, adjust a scheduling policy to its original status. If a timer expires or a counter exceeds a preset time threshold or the maximum number of times, and the status of the short-range link between the UE2 and the beneficiary UE still does not recover, the base station eNB may delete the UE2 from the synthesis communications group of the beneficiary UE, specifically, may delete an identifier of the UE2 and a pairing identifier between the UE2 and the beneficiary UE from a support list of the beneficiary UE.

603. The eNB sends synthetic layer deletion information to the UE2.

The synthetic layer deletion information includes an identifier of the beneficiary UE, and the UE2 deletes, according to the received synthetic layer deletion information, a synthetic layer configuration corresponding to the beneficiary UE.

604. The eNB sends an RRC reconfiguration message (second synthesis update information) to the beneficiary UE.

Specifically, the eNB sends the second synthesis update information to the beneficiary UE by using higher layer signaling such as the RRC reconfiguration message, where the second synthesis update information includes the UE2, so that the beneficiary UE deletes a synthetic layer configuration corresponding to the UE2.

605. A core network CN sends, to the eNB, downlink data that is to be sent to the beneficiary UE.

606. The eNB sends the downlink data to a supporting UE1.

For example, the base station eNB may acquire channel quality information of each supporting UE in the support list of the beneficiary UE. If channel quality information of the supporting UE1 is the best, the base station eNB selects the supporting UE1 as a current supporting UE of the beneficiary UE and sends the downlink data to the supporting UE1.

607. The supporting UE1 sends the downlink data to the beneficiary UE.

In this embodiment of the present invention, after a base station detects that, due to deterioration of channel quality information, a supporting UE cannot serve as a supporting UE of a beneficiary UE and channel quality of the supporting UE does not recover within a preset time threshold range, the base station may actively delete the supporting UE from a synthesis communications group of the beneficiary UE, so that a synthetic layer configuration that cannot serve as the supporting UE of the beneficiary UE may be released in time and a cooperative relationship between the beneficiary UE and the supporting UE can be updated in time, thereby improving reliability of data transmission for the beneficiary UE.

Figure 7:
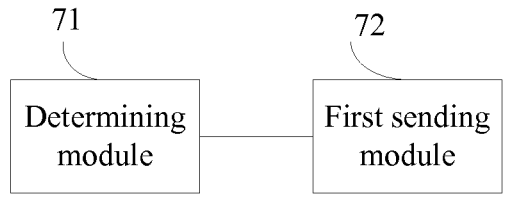
FIG. 7 is a schematic structural diagram of an access network device according to another embodiment of the present invention.

FIG. 7 is a schematic structural diagram of an access network device according to another embodiment of the present invention. As shown in FIG. 7, the access network device includes a determining module 71, configured to, when downlink data belonging to a first user equipment UE is received, if it is determined that a supporting UE in a support list of the first UE cannot serve as a current supporting UE of the downlink data, establish a cooperative communication relationship between a second UE and the first UE, that is, set the second UE as the current supporting UE of the first UE, where the second UE is another UE except the first UE and the supporting UE in the support list of the first UE; and a first sending module 72, configured to, on the basis that the determining module sets the second UE as the current supporting UE of the first UE, send the downlink data to the second UE, so that the second UE sends the downlink data to the first UE.

Figure 8:
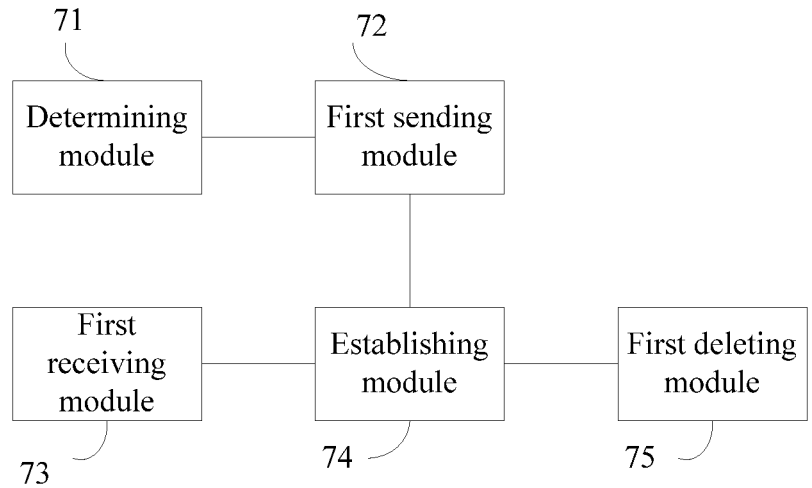
FIG. 8 is another schematic structural diagram of the access network device according to the embodiment shown in FIG. 7.

In an optional implementation manner of the present invention, FIG. 8 is another schematic structural diagram of the access network device according to the embodiment shown in FIG. 7. As shown in FIG. 8, the access network device further includes:

a first receiving module 73, configured to receive synthesis request information that is sent by the second UE by using higher layer signaling, where the synthesis request information includes a pairing identifier, and the pairing identifier is a pairing identifier between the first UE and the second UE; and an establishing module 74, configured to, on the basis of the synthesis request information received by the first receiving module, save the pairing identifier and an identifier of the second UE into the support list of the first UE and set the second UE as the current supporting UE of the downlink data.

The first sending module 72 is further configured to, on the basis that the establishing module sets the second UE as the current supporting UE of the first UE, send synthesis establishment information to the second UE by using higher layer signaling, so that the second UE sets, according to the synthesis establishment information, a synthetic layer configuration corresponding to the first UE.

The first sending module 72 is further configured to, on the basis that the establishing module sets the second UE as the current supporting UE of the first UE, send first synthesis update information to the first UE by using higher layer signaling, so that the first UE sets, according to the first synthesis update information, a synthetic layer configuration corresponding to the second UE.

In an optional implementation manner of the present invention, the first sending module 72 is further configured to send synthesis establishment information to the second UE by using higher layer signaling, so that the second UE sets, according to the synthesis establishment information, a synthetic layer configuration corresponding to the first UE.

The first receiving module 73 is further configured to receive, by using higher layer signaling, synthesis establishment response information returned by the second UE, where the synthesis establishment response information includes a pairing identifier, and the pairing identifier is a pairing identifier between the first UE and the second UE.

The establishing module 74 is further configured to, on the basis of the synthesis establishment response information that is returned by the second UE and received by the first receiving module, save the pairing identifier and an identifier of the second UE into the support list of the first UE and set the second UE as the current supporting UE of the downlink data.

The first sending module 72 is further configured to, on the basis that the establishing module sets the second UE as the current supporting UE of the first UE, send first synthesis update information to the first UE by using higher layer signaling, so that the first UE sets, according to the first synthesis update information, a synthetic layer configuration corresponding to the another UE.

In an optional implementation manner of the present invention, the first receiving module 73 is further configured to receive, by using higher layer signaling, synthesis release request information sent by the second UE, where the synthesis release request information includes the pairing identifier between the first UE and the second UE.

The access network device further includes a first deleting module 75, configured to, on the basis that the first receiving module receives the synthesis release request information that is sent by the second UE, delete the identifier of the second UE and the pairing identifier from the support list of the first UE.

The first sending module 72 is further configured to, on the basis that the first deleting module deletes the identifier of the second UE and the pairing identifier from the support list of the first UE, send synthesis release response information to the second UE by using higher layer signaling, so that the second UE deletes the synthetic layer configuration corresponding to the first UE.

The first sending module 72 is further configured to, on the basis that the first deleting module deletes the identifier of the second UE and the pairing identifier from the support list of the first UE, send second synthesis update information to the first UE by using higher layer signaling, where the second synthesis update information includes the identifier of the second UE, so that the first UE deletes the synthetic layer configuration corresponding to the second UE.

In an optional implementation manner of the present invention, the first deleting module 75 is further configured to delete the identifier of the second UE and the pairing identifier between the first UE and the second UE from the support list of the first UE if it is determined that the second UE is inappropriate to serve as a supporting UE of the first UE.

The first sending module 72 is further configured to, on the basis that the first deleting module deletes the identifier of the second UE and the pairing identifier between the first UE and the second UE from the support list of the first UE, send synthesis deletion information to the second UE by using higher layer signaling, where the synthesis deletion information includes an identifier of the first UE, so that the second UE deletes the synthetic layer configuration corresponding to the first UE.

The first sending module 72 is further configured to, on the basis that the first deleting module deletes the identifier of the second UE and the pairing identifier between the first UE and the second UE from the support list of the first UE, send second synthesis update information to the first UE by using higher layer signaling, where the second synthesis update information includes the identifier of the second UE, so that the first UE deletes the synthetic layer configuration corresponding to the second UE.

In an optional implementation manner of the present invention, the first deleting module 75 is specifically configured to delete the identifier of the second UE and the pairing identifier between the first UE and the second UE from the support list of the first UE if it is determined that a time during which the second UE is inappropriate to serve as the supporting UE of the first UE is greater than a preset time threshold.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

Figure 9:
FIG. 9 is a schematic structural diagram of a user equipment according to another embodiment of the present invention.

FIG. 9 is a schematic structural diagram of a user equipment according to another embodiment of the present invention. As shown in FIG. 9, the user equipment includes a second receiving module 91, configured to receive downlink data that belongs to a first UE and is sent by an access network device, where when the access network device receives the downlink data belonging to the first UE, if it is determined that a supporting UE in a support list of the first UE cannot serve as a current supporting UE of the downlink data, a cooperative communication relationship is established between a second UE and the first UE, and the second UE is determined by the access network device as the current supporting UE of the first UE, where the second UE is another UE except the first UE and the supporting UE in the support list of the first UE; and a second sending module 92, configured to send, to the first UE, the downlink data received by the second receiving module.

In an optional implementation manner of the present invention, the second sending module 92 is further configured to send synthesis request information to the access network device by using higher layer signaling, where the synthesis request information includes a pairing identifier, and the pairing identifier is a pairing identifier between the first UE and the second UE, so that the access network device saves the pairing identifier and an identifier of the second UE into the support list of the first UE, sets the second UE as the current supporting UE of the downlink data, and sends synthesis establishment information to the second UE by using higher layer signaling.

Figure 10:
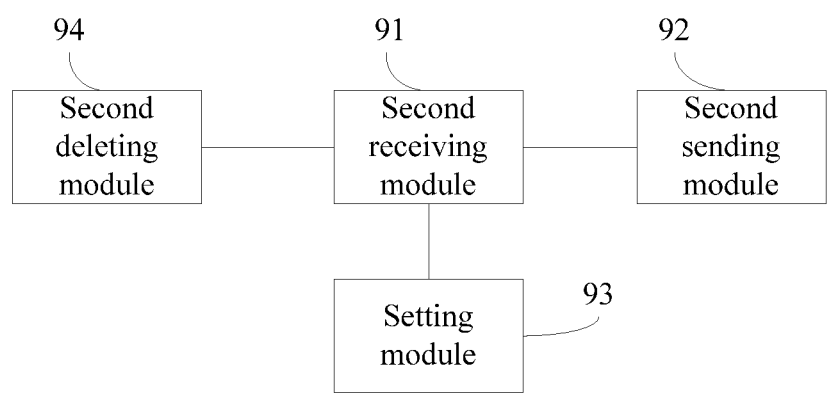
FIG. 10 is another schematic structural diagram of the user equipment according to the embodiment shown in FIG. 9.

FIG. 10 is another schematic structural diagram of the user equipment according to the embodiment shown in FIG. 9. As shown in FIG. 10, the user equipment further includes a setting module 93, configured to set, according to the synthesis establishment information that is sent by the access network device by using the higher layer signaling, a synthetic layer configuration corresponding to the first UE.

In an optional implementation manner of the present invention, the second receiving module 91 is further configured to receive synthesis establishment information that is sent by the access network device by using higher layer signaling.

The setting module 93 is further configured to set, according to the synthesis establishment information, a synthetic layer configuration corresponding to the first UE.

The second sending module 92 is further configured to return synthesis establishment response information to the access network device by using higher layer signaling, where the synthesis establishment response information includes a pairing identifier, and the pairing identifier is a pairing identifier between the first UE and the second UE, so that the access network device saves the pairing identifier and an identifier of the second UE into the support list of the first UE and sets the second UE as the current supporting UE of the downlink data.

In an optional implementation manner of the present invention, the second sending module 92 is further configured to send synthesis release request information to the access network device by using higher layer signaling, where the synthesis release request information includes the pairing identifier between the first UE and the second UE, so that the access network device deletes the identifier of the second UE and the pairing identifier from the support list of the first UE.

The user equipment further includes a second deleting module 94, further configured to delete, according to the synthesis release response information that is returned by the access network device by using the higher layer signaling, the synthetic layer configuration corresponding to the first UE.

In an optional implementation manner of the present invention, the second deleting module 94 is further configured to, according to synthesis deletion information that is sent by the access network device by using higher layer signaling, delete the synthetic layer configuration corresponding to the first UE, where the synthesis deletion information includes an identifier of the first UE, and the synthesis deletion information is synthesis deletion information that is sent to the second UE after the access network device determines that the second UE is inappropriate to serve as a supporting UE of the first UE and deletes the identifier of the second UE and the pairing identifier between the first UE and the second UE from the support list of the first UE.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

Another embodiment of the present invention provides a cooperative communication system, where the system includes: the access network device according to the embodiment shown in FIG. 7 or FIG. 8, and the user equipment according to the embodiment shown in FIG. 9 or FIG. 10. For a detailed description of the access network device, reference may be made to related content in the embodiments corresponding to FIG. 7 to FIG. 8; and for a detailed description of the user equipment, reference may be made to related content in the embodiments corresponding to FIG. 9 to FIG. 10, and details are not described herein again.

Another embodiment of the present invention provides an access network device, where the access network device includes a processor. When the processor runs, the following steps may be executed: when downlink data belonging to a first user equipment UE is received, if it is determined that a supporting UE in a support list of the first UE cannot serve as a current supporting UE of the downlink data, establishing a cooperative communication relationship between a second UE and the first UE, that is, setting the second UE as the current supporting UE of the first UE, where the second UE is another UE except the first UE and the supporting UE in the support list of the first UE; and sending the downlink data to the second UE, so that the second UE sends the downlink data to the first UE.

In a first possible implementation manner, in the step of establishing a cooperative communication relationship between a second UE and the first UE, the processor specifically executes the following steps: receiving synthesis request information that is sent by the second UE by using higher layer signaling, where the synthesis request information includes a pairing identifier, and the pairing identifier is a pairing identifier between the first UE and the second UE; saving the pairing identifier and an identifier of the second UE into the support list of the first UE and setting the second UE as the current supporting UE of the downlink data; sending synthesis establishment information to the second UE by using higher layer signaling, so that the second UE sets, according to the synthesis establishment information, a synthetic layer configuration corresponding to the first UE; and sending first synthesis update information to the first UE by using higher layer signaling, so that the first UE sets, according to the first synthesis update information, a synthetic layer configuration corresponding to the second UE.

In a second possible implementation manner, in the step of establishing a cooperative communication relationship between a second UE and the first UE, the processor specifically executes the following steps: sending synthesis establishment information to the second UE by using higher layer signaling, so that the second UE sets, according to the synthesis establishment information, a synthetic layer configuration corresponding to the first UE; receiving, by using higher layer signaling, synthesis establishment response information returned by the second UE, where the synthesis establishment response information includes a pairing identifier, and the pairing identifier is a pairing identifier between the first UE and the second UE; saving the pairing identifier and an identifier of the second UE into the support list of the first UE and setting the second UE as the current supporting UE of the downlink data; and sending first synthesis update information to the first UE by using higher layer signaling, so that the first UE sets, according to the first synthesis update information, a synthetic layer configuration corresponding to the another UE.

Based on the first or second possible implementation manner, in a third possible implementation manner, the processor may further execute the following steps: receiving, by using higher layer signaling, synthesis release request information sent by the second UE, where the synthesis release request information includes the pairing identifier between the first UE and the second UE; deleting the identifier of the second UE and the pairing identifier from the support list of the first UE; sending synthesis release response information to the second UE by using higher layer signaling, so that the second UE deletes the synthetic layer configuration corresponding to the first UE; and sending second synthesis update information to the first UE by using higher layer signaling, where the second synthesis update information includes the identifier of the second UE, so that the first UE deletes the synthetic layer configuration corresponding to the second UE.

Based on the first or second possible implementation manner, in a fourth possible implementation manner, the processor may further execute the following steps: deleting the identifier of the second UE and the pairing identifier between the first UE and the second UE from the support list of the first UE if it is determined that the second UE is inappropriate to serve as a supporting UE of the first UE; sending synthesis deletion information to the second UE by using higher layer signaling, where the synthesis deletion information includes an identifier of the first UE, so that the second UE deletes the synthetic layer configuration corresponding to the first UE; and sending second synthesis update information to the first UE by using higher layer signaling, where the second synthesis update information includes the identifier of the second UE, so that the first UE deletes the synthetic layer configuration corresponding to the second UE.

Based on the fourth possible implementation manner, in a fifth possible implementation manner, in the step of deleting the identifier of the second UE and the pairing identifier between the first UE and the second UE from the support list of the first UE if it is determined that the second UE is inappropriate to serve as a supporting UE of the first UE, the processor specifically executes the following step: deleting the identifier of the second UE and the pairing identifier between the first UE and the second UE from the support list of the first UE if it is determined that a time during which the second UE is inappropriate to serve as the supporting UE of the first UE is greater than a preset time threshold.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

Another embodiment of the present invention provides a user equipment, where the user equipment includes a processor. When the processor runs, the following steps may be executed: receiving downlink data that belongs to a first UE and is sent by an access network device, where when the access network device receives the downlink data belonging to the first UE, if it is determined that a supporting UE in a support list of the first UE cannot serve as a current supporting UE of the downlink data, a cooperative communication relationship is established between a second UE and the first UE, and the second UE is determined by the access network device as the current supporting UE of the first UE, where the second UE is another UE except the first UE and the supporting UE in the support list of the first UE; and sending the downlink data to the first UE.

In a first possible implementation manner, the processor may execute the following steps: sending synthesis request information to the access network device by using higher layer signaling, where the synthesis request information includes a pairing identifier, and the pairing identifier is a pairing identifier between the first UE and the second UE, so that the access network device saves the pairing identifier and an identifier of the second UE into the support list of the first UE, sets the second UE as the current supporting UE of the downlink data, and sends synthesis establishment information to the second UE by using higher layer signaling; and setting, according to the synthesis establishment information that is sent by the access network device by using the higher layer signaling, a synthetic layer configuration corresponding to the first UE.

In a second possible implementation manner, the processor may execute the following steps: receiving synthesis establishment information that is sent by the access network device by using higher layer signaling, and setting, according to the synthesis establishment information, a synthetic layer configuration corresponding to the first UE; and returning synthesis establishment response information to the access network device by using higher layer signaling, where the synthesis establishment response information includes a pairing identifier, and the pairing identifier is a pairing identifier between the first UE and the second UE, so that the access network device saves the pairing identifier and an identifier of the second UE into the support list of the first UE and sets the second UE as the current supporting UE of the downlink data.

Based on the first or second possible implementation manner, in a third possible implementation manner, the processor may further execute the following steps: sending synthesis release request information to the access network device by using higher layer signaling, where the synthesis release request information includes the pairing identifier between the first UE and the second UE, so that the access network device deletes the identifier of the second UE and the pairing identifier from the support list of the first UE; and receiving synthesis release response information that is returned by the access network device by using higher layer signaling, and deleting the synthetic layer configuration corresponding to the first UE.

Based on the first or second possible implementation manner, in a fourth possible implementation manner, the processor may further execute the following steps: receiving, by using higher layer signaling, synthesis deletion information sent by the access network device, where the synthesis deletion information includes an identifier of the first UE, and the synthesis deletion information is synthesis deletion information that is sent to the second UE after the access network device determines that the second UE is inappropriate to serve as a supporting UE of the first UE and deletes the identifier of the second UE and the pairing identifier between the first UE and the second UE from the support list of the first UE; and deleting the synthetic layer configuration corresponding to the first UE.

In this embodiment of the present invention, when an access network device receives downlink data belonging to a first UE, if it is determined that a supporting UE in a support list of the first UE cannot serve as a current supporting UE of the downlink data, a second UE may be set as the current supporting UE of the first UE by establishing a cooperative communication relationship between the second UE and the first UE, where the second UE is any other UE except the first UE and the supporting UE in the support list of the first UE; and the downlink data is sent to the second UE, so that the second UE forwards the downlink data to the first UE. In this way, it can be ensured that, when the supporting UE in the support list of the first UE cannot bear the downlink data sent to the first UE, a second UE with good channel quality may be selected in time as the current supporting UE of the first UE, so that a cooperative relationship between the first UE and the current supporting UE may be updated in time, thereby improving reliability of data transmission for the first UE.

Further, in this embodiment of the present invention, the second UE actively sends synthesis release request information to the access network device, so that the access network device deletes the second UE from the support list of the first UE; or after the access network device detects that, due to deterioration of a channel quality status, the second UE cannot serve as a supporting UE of the first UE and channel quality of the second UE does not recover within a preset time threshold range, the access network device may actively delete the second UE from the support list of the first UE, so that a synthetic layer configuration that cannot serve as the supporting UE of the first UE may be released in time and a cooperative relationship between the first UE and the supporting UE can be updated in time, thereby improving reliability of data transmission for the first UE.

It may be clearly understood by persons skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual requirements to achieve the purposes of the solutions in the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

Nearly all smartphones can support both a short-range communications technology (such as WiFi or BlueTooth) and a cellular communications technology (such as LTE, 3G UMTS, CDMA, 2G GSM, or WiMAX). By using that the cellular technology is SAE/LTE and the short-range communications technology is WiFi as an example, in a scenario of cooperative communication between a single network node and multiple users, or referred to as a multiuser cooperative communication (multiple UEs cooperative communication, MUCC for short) scenario, when at least two UEs have a feature of supporting both WiFi and LTE, to increase a throughput rate and reliability, a MUCC relationship may be established between the at least two UEs, that is, one UE of the at least two UEs needs to send or receive data, and another UE except the one UE may provide support and assist the one UE in performing communication. In the present invention, the one UE is named a beneficiary UE, a served UE or an assisted UE, and the another UE except the one UE is named a supporting UE, a serving UE, or an assisting UE. Naming of the foregoing UEs is merely an example provided in the present invention, and naming of the UEs in the present invention includes but is not limited to the foregoing example of the naming.

By using the supporting UE and the beneficiary UE as an example, the beneficiary UE is a final sender of uplink data or a final receiver of downlink data (from a cellular perspective). For a bearer, generally there is only one bearer, and the supporting UE is a UE used to assist the beneficiary UE in data forwarding. For a bearer of the beneficiary UE, there may be multiple bearers.

By using the supporting UE and the beneficiary UE as an example, concepts of the beneficiary UE and the supporting UE are derived from a perspective of a bearer of the beneficiary UE. For example, a UE1 and a UE2 form MUCC and can assist each other in communication. In this way, from a perspective of a bearer of the UE1, the UE2 can support the bearer of the UE1, so that the UE1 is a beneficiary UE and the UE2 is a supporting UE. Meanwhile, the UE1 can also support a bearer of the UE2. Therefore, from a perspective of this bearer of the UE2, the UE2 is a beneficiary UE and the UE1 is a supporting UE.

By using the supporting UE and the beneficiary UE as an example, when the foregoing UEs are within a same short-range connection area, a network may separately send downlink data to the foregoing supporting UE and beneficiary UE (an optimized method is that during network scheduling, a UE that has a best radio link condition at that time for sending) is always selected. When the network sends the downlink data to the supporting UE, the supporting UE that receives the data then sends, by means of short-range communications (such as WiFi), the data to the beneficiary UE. Certainly, the data may also be directly sent to the beneficiary UE, and the beneficiary UE combines the data. Similarly, uplink data of the beneficiary UE may also be sent to the network by using the beneficiary UE itself or another supporting UE, and then the network combines the data and completes cooperative communication between the UEs.

Cooperative transmission via the supporting UE may increase a throughput rate and reliability of communication of the beneficiary UE.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however, these modifications and replacements do not make the essence of corresponding technical solutions depart from the scope of the technical solutions in the embodiments of the present invention.

What is claimed is:

1. A cooperative communication method, comprising:
receiving, by an access network device, downlink data belonging to a first user equipment (UE);
determining that each supporting UE in a support list of the first UE stored at the access network device cannot serve as a current supporting UE of the downlink data due to a channel quality between the first UE and the respective supporting UE;
identifying a second UE as a potential supporting UE for the first UE in response to receiving, from the second UE, a pairing identifier associated with the first UE and information regarding channel quality between the first UE and the second UE, wherein the support list of the first UE excludes the second UE during the determining that each supporting UE in the support list of the first UE cannot serve as the current supporting UE of the downlink data;
adding, in response to the identifying the second UE as the potential supporting UE, the pairing identifier associated with the first UE, an identifier of the second UE and the information regarding the channel quality between the first UE and the second UE to the support list of the first UE;
establishing, in response to, and after, the determining that each supporting UE in the support list of the first UE cannot serve as the current supporting UE of the downlink data, and further in response to the adding the pairing identifier associated with the first UE to the support list of the first UE, a cooperative communication relationship between the first UE and the second UE by setting the second UE as the current supporting UE of the first UE;
sending the downlink data to the second UE, the sending the downlink data to the second UE causing the second UE to send the downlink data to the first UE; and
deleting the added information from the support list of the first UE in response to one of receiving a release request from the second UE or a report indicating a poor quality of the channel between the first UE and second UE.

2. The method according to claim 1, wherein the identifying the second UE as the potential supporting UE and the establishing the cooperative communication relationship between a second UE and the first UE comprises:
  receiving, by the access network device, synthesis request information that is sent by the second UE by using higher layer signaling, wherein the higher layer signaling uses one of an radio link control (RLC) protocol or an radio resource control (RRC) message, wherein the synthesis request information comprises a pairing identifier, and the pairing identifier is a pairing identifier between the first UE and the second UE;
  wherein the establishing the cooperative communication relationship between the first UE and the second UE comprises:
    setting the second UE as the current supporting UE of the downlink data;
    sending synthesis establishment information to the second UE by using the higher layer signaling, so that the second UE sets, according to the synthesis establishment information, a synthetic layer configuration corresponding to the first UE; and
    sending first synthesis update information to the first UE by using the higher layer signaling, so that the first UE sets, according to the first synthesis update information, a synthetic layer configuration corresponding to the second UE.

3. The method according to claim 2, wherein the deleting the added information from the support list of the first UE comprises:
  receiving, by the access network device by using the higher layer signaling, synthesis release request information sent by the second UE, wherein the synthesis release request information comprises the pairing identifier between the first UE and the second UE;
  deleting the identifier of the second UE and the pairing identifier from the support list of the first UE;
  sending synthesis release response information to the second UE by using the higher layer signaling, so that the second UE deletes the synthetic layer configuration corresponding to the first UE; and
  sending second synthesis update information to the first UE by using the higher layer signaling, wherein the second synthesis update information comprises the identifier of the second UE, so that the first UE deletes the synthetic layer configuration corresponding to the second UE.

4. The method according to claim 2, wherein the deleting the added information from the support list of the first UE comprises:
  determining that the second UE is inappropriate to serve as a supporting UE of the first UE;
  deleting, by the access network device, the identifier of the second UE and the pairing identifier between the first UE and the second UE from the support list of the first UE;
  sending synthesis deletion information to the second UE by using the higher layer signaling, wherein the synthesis deletion information comprises an identifier of the first UE, so that the second UE deletes the synthetic layer configuration corresponding to the first UE; and
  sending second synthesis update information to the first UE by using the higher layer signaling, wherein the second synthesis update information comprises the identifier of the second UE, so that the first UE deletes the synthetic layer configuration corresponding to the second UE.

5. The method according to claim 4, wherein deleting the identifier of the second UE and the pairing identifier between the first UE and the second UE from the support list of the first UE comprises deleting, by the access network device, the identifier of the second UE and the pairing identifier between the first UE and the second UE from the support list of the first UE when it is determined that a time during which the second UE is inappropriate to serve as the supporting UE of the first UE is greater than a preset time threshold.

6. The method according to claim 1, wherein the identifying the second UE as the potential supporting UE, the adding the pairing identifier associated with the first UE to the support list of the first UE, and the establishing the cooperative communication relationship between a second UE and the first UE comprises:
  sending, by the access network device, synthesis establishment information to the second UE by using higher layer signaling, so that the second UE sets, according to the synthesis establishment information, a synthetic layer configuration corresponding to the first UE;
  receiving, by using the higher layer signaling, synthesis establishment response information returned by the second UE, wherein the synthesis establishment response information comprises a pairing identifier, and the pairing identifier is a pairing identifier between the first UE and the second UE;
  saving the pairing identifier and an identifier of the second UE into the support list of the first UE and setting the second UE as the current supporting UE of the downlink data; and
  sending first synthesis update information to the first UE by using the higher layer signaling, so that the first UE sets, according to the first synthesis update information, a synthetic layer configuration corresponding to the second UE.

7. The method according to claim 6, wherein the deleting the added information from the support list of the first UE comprises:
  receiving, by the access network device by using the higher layer signaling, synthesis release request information sent by the second UE, wherein the synthesis release request information comprises the pairing identifier between the first UE and the second UE;
  deleting the identifier of the second UE and the pairing identifier from the support list of the first UE;
  sending synthesis release response information to the second UE by using the higher layer signaling, so that the second UE deletes the synthetic layer configuration corresponding to the first UE; and
  sending second synthesis update information to the first UE by using the higher layer signaling, wherein the second synthesis update information comprises the identifier of the second UE, so that the first UE deletes the synthetic layer configuration corresponding to the second UE.

8. The method according to claim 6, wherein the deleting the added information from the support list of the first UE comprises:
  determining that the second UE is inappropriate to serve as a supporting UE of the first UE;
  deleting, by the access network device, the identifier of the second UE and the pairing identifier between the first UE and the second UE from the support list of the first UE;
  sending synthesis deletion information to the second UE by using the higher layer signaling, wherein the synthesis deletion information comprises an identifier of the first UE, so that the second UE deletes the synthetic layer configuration corresponding to the first UE; and sending second synthesis update information to the first UE by using the higher layer signaling, wherein the second synthesis update information comprises the identifier of the second UE, so that the first UE deletes the synthetic layer configuration corresponding to the second UE.

9. The method according to claim 8, wherein deleting the identifier of the second UE and the pairing identifier between the first UE and the second UE from the support list of the first UE comprises deleting, by the access network device, the identifier of the second UE and the pairing identifier between the first UE and the second UE from the support list of the first UE when it is determined that a time during which the second UE is inappropriate to serve as the supporting UE of the first UE is greater than a preset time threshold.

10. An access network device, comprising:
a processor; and
a computer-readable storage medium storing a program to be executed by the processor, the program including instructions for:
determining when downlink data belonging to a first user equipment (UE) is received;
determining that each supporting UE in a support list of the first UE stored in a memory of the access network device cannot serve as a current supporting UE of the downlink data due to a channel quality between the first UE and the respective supporting UE;
identifying a second UE as a potential supporting UE for the first UE in response to receiving, from the second UE, a pairing identifier associated with the first UE and information regarding channel quality between the first UE and the second UE, wherein the support list of the first UE excludes the second UE during the determining that each supporting UE in the support list of the first UE cannot serve as the current supporting UE of the downlink data;
adding, in response to the identifying the second UE as the potential supporting UE, the pairing identifier associated with the first UE, an identifier of the second UE and the information regarding the channel quality between the first UE and the second UE to the support list of the first UE;
setting, in response to, and after, the determining that each supporting UE in the support list of the first UE cannot serve as the current supporting UE of the downlink data, and further in response to the adding the pairing identifier associated with the first UE to the support list of the first UE the second UE as the current supporting UE of the first UE;
sending the downlink data to the second UE in response to setting the second UE as the current supporting UE of the first UE, the sending the downlink data to the second UE causing the second UE to send the downlink data to the first UE; and
deleting the added information from the support list of the first UE in response to one of receiving a release request from the second UE or a report indicating a poor quality of the channel between the first UE and second UE.

11. The access network device according to claim 10, wherein the instructions for identifying the second UE as the potential supporting UE includes instructions for:
receiving synthesis request information that is sent by the second UE by using higher layer signaling, wherein the higher layer signaling uses one of an Radio Link Control (RLC) protocol or an radio resource control (RRC) message, wherein the synthesis request information comprises a pairing identifier, and the pairing identifier is a pairing identifier between the first UE and the second UE; and
wherein the instructions for establishing the cooperative communication relationship between the first UE and the second UE include instructions for:
saving the pairing identifier and an identifier of the second UE into the support list of the first UE according to the synthesis request information;
setting the second UE as the current supporting UE of the downlink data;
sending synthesis establishment information to the second UE by using the higher layer signaling, so that the second UE sets, according to the synthesis establishment information, a synthetic layer configuration corresponding to the first UE; and
sending, based on setting the second UE as the current supporting UE of the first UE, first synthesis update information to the first UE by using the higher layer signaling, so that the first UE sets, according to the first synthesis update information, a synthetic layer configuration corresponding to the second UE.

12. The access network device according to claim 10, wherein the instructions for identifying the second UE as the potential supporting UE and adding the pairing identifier associated with the first UE to the support list of the first UE include instructions for:
sending synthesis establishment information to the second UE by using higher layer signaling, so that the second UE sets, according to the synthesis establishment information, a synthetic layer configuration corresponding to the first UE;
receiving, by using the higher layer signaling, synthesis establishment response information returned by the second UE, wherein the synthesis establishment response information comprises a pairing identifier, and the pairing identifier is a pairing identifier between the first UE and the second UE;
based on the synthesis establishment response information that is returned by the second UE, saving the pairing identifier and an identifier of the second UE into the support list of the first UE and set the second UE as the current supporting UE of the downlink data; and
based on setting the second UE as the current supporting UE of the first UE, sending first synthesis update information to the first UE by using the higher layer signaling, so that the first UE sets, according to the first synthesis update information, a synthetic layer configuration corresponding to the second UE.

13. The access network device according to claim 12, wherein the instructions for deleting the added information from the support list of the first UE include instructions for:
receiving, by using the higher layer signaling, synthesis release request information sent by the second UE, wherein the synthesis release request information comprises the pairing identifier between the first UE and the second UE;
deleting, based on receipt of the synthesis release request information that is sent by the second UE, the identifier of the second UE and the pairing identifier from the support list of the first UE;
based on deleting the identifier of the second UE and the pairing identifier from the support list of the first UE, sending synthesis release response information to the second UE by using the higher layer signaling, so that the second UE deletes the synthetic layer configuration corresponding to the first UE; and based on deleting the identifier of the second UE and the pairing identifier from the support list of the first UE, sending second synthesis update information to the first UE by using the higher layer signaling, wherein the second synthesis update information comprises the identifier of the second UE, so that the first UE deletes the synthetic layer configuration corresponding to the second UE.

14. The access network device according to claim 12, wherein the instructions for deleting the added information from the support list of the first UE include instructions for:

deleting the identifier of the second UE and the pairing identifier between the first UE and the second UE from the support list of the first UE when it is determined that the second UE is inappropriate to serve as a supporting UE of the first UE;

sending synthesis deletion information to the second UE by using the higher layer signaling, wherein the synthesis deletion information comprises an identifier of the first UE, so that the second UE deletes the synthetic layer configuration corresponding to the first UE; and sending second synthesis update information to the first UE by using the higher layer signaling, wherein the second synthesis update information comprises the identifier of the second UE, so that the first UE deletes the synthetic layer configuration corresponding to the second UE.

15. The access network device according to claim 14, wherein the instructions for deleting the added information from the support list of the first UE include instructions for, after it is determined that the second UE is inappropriate to serve as a supporting UE of the first UE, deleting the identifier of the second UE and the pairing identifier between the first UE and the second UE from the support list of the first UE when it is determined that a time during which the second UE is inappropriate to serve as the supporting UE of the first UE is greater than a preset time threshold.

16. A user equipment, comprising:
a processor; and
a computer-readable storage medium storing a program to be executed by the processor, the program including instructions for:

sending a pairing identifier associated with the first user equipment (UE) to an access network device;

establishing a cooperative communication relationship with a first UE in response to a message from the access network device sent in response to the pairing identifier and information regarding channel quality between the first UE and the user equipment being received at the access network device, the message indicating that the access network device has received downlink data belonging to the first UE, the message further indicating that each supporting UE in a support list of the first UE stored at the network access device cannot serve as a current supporting UE of the downlink data due to a channel quality between the first UE and the respective supporting UE, the message further indicating that the network access device has determined the user equipment, which is not in the support list of the first UE during determining that each supporting UE in the support list of the first UE cannot serve as the current supporting UE of the downlink data, to be the current supporting UE of the first UE, the message further indicating the addition, to the support list of the first UE, in response to the determining the user equipment to be the current supporting UE of the first UE, of the pairing identifier associated with the first UE, an identifier of the user equipment and the information regarding the channel quality between the first UE and user equipment, wherein the cooperative communications relationship is established in response to the adding the pairing identifier associated with the first UE to the support list of the first UE;

receiving downlink data that belongs to the first UE and is sent by the access network device;

sending, to the first UE, the downlink data; and deleting, according to synthesis deletion information that is sent by the access network device, a synthetic layer configuration corresponding to the first UE, wherein the synthesis deletion information is synthesis deletion information that is sent to the user equipment after the access network device determines that the user equipment is inappropriate to serve as a supporting UE of the first UE in response to one of receiving a release request from the second UE or a report indicating a poor quality of the channel between the first UE and second UE and after the access network device deletes the added information from the support list of the first UE.

17. The user equipment according to claim 16, wherein the program includes further instructions for:

sending synthesis request information to the access network device by using higher layer signaling, wherein the higher layer signaling uses one of an Radio Link Control (RLC) protocol or an radio resource control (RRC) message, wherein the synthesis request information comprises a pairing identifier, and the pairing identifier is a pairing identifier between the first UE and the user equipment, so that the access network device saves the pairing identifier and an identifier of the user equipment into the support list of the first UE, sets the user equipment as the current supporting UE of the downlink data, and sends synthesis establishment information to the user equipment by using the higher layer signaling; and setting, according to the synthesis establishment information that is sent by the access network device by using the higher layer signaling, a synthetic layer configuration corresponding to the first UE.

18. The user equipment according to claim 16, wherein the program includes further instructions for:

receiving synthesis establishment information that is sent by the access network device by using higher layer signaling;

setting, according to the synthesis establishment information, a synthetic layer configuration corresponding to the first UE; and returning synthesis establishment response information to the access network device by using the higher layer signaling, wherein the synthesis establishment response information comprises a pairing identifier, and the pairing identifier is a pairing identifier between the first UE and the user equipment, so that the access network device saves the pairing identifier and an identifier of the user equipment into the support list of the first UE and sets the user equipment as the current supporting UE of the downlink data.

19. The user equipment according to claim 18, wherein the instructions for deleting the synthetic layer configuration corresponding to the first UE include instructions for:
sending synthesis release request information to the access network device by using the higher layer signaling, wherein the synthesis release request information comprises the pairing identifier between the first UE and the user equipment, so that the access network device deletes the identifier of the user equipment and the pairing identifier from the support list of the first UE; and
deleting, according to a synthesis release response information that is returned by the access network device by using the higher layer signaling, the synthetic layer configuration corresponding to the first UE.

20. The user equipment according to claim 19, wherein the program includes further instructions for deleting, according to synthesis deletion information that is sent by the access network device by using the higher layer signaling, the synthetic layer configuration corresponding to the first UE, wherein the synthesis deletion information comprises an identifier of the first UE, and the synthesis deletion information is synthesis deletion information that is sent to the user equipment after the access network device determines that the user equipment is inappropriate to serve as a supporting UE of the first UE and deletes the identifier of the user equipment and the pairing identifier between the first UE and the user equipment from the support list of the first UE.

21. A method, comprising:
sending a pairing identifier associated with a first user equipment (UE) by a second UE to an access network device;
establishing, by the second UE, a cooperative communication relationship with the first UE in response to a message from the access network device sent in response to the pairing identifier and information regarding channel quality between the first UE and the user equipment being received at the access network device, the message indicating that the access network device has received downlink data belonging to the first UE, the message further indicating that each supporting UE in a support list of the first UE stored at the network access device cannot serve as a current supporting UE of the downlink data due to a channel quality between the first UE and the respective supporting UE, the message further indicating that the network access device has determined the second UE, which is not in the support list of the first UE during determining that each supporting UE in the support list of the first UE cannot serve as the current supporting UE of the downlink data, to be the current supporting UE of the first UE, the message further indicating the addition, to the support list of the first UE, in response to the determining the user equipment to be the current supporting UE of the first UE, of the pairing identifier associated with the first UE, an identifier of the user equipment and the information regarding the channel quality between the first UE and user equipment, wherein the cooperative communications relationship is established in response to the adding the pairing identifier associated with the first UE to the support list of the first UE;
receiving, by the second UIE, downlink data that belongs to the first UE and is sent by an access network device;
sending, by the second UE, the downlink data to the first UE; and deleting, according to synthesis deletion information that is sent by the access network device, a synthetic layer configuration corresponding to the first UE, wherein the synthesis deletion information is synthesis deletion information that is sent to the user equipment after the access network device determines that the user equipment is inappropriate to serve as a supporting UE of the first UE in response to one of receiving a release request from the second UE or a report indicating a poor quality of the channel between the first UE and second UE and after the access network device deletes the added information from the support list of the first UE.

22. The method according to claim 21, wherein the method further comprises:
sending synthesis request information to the access network device by using higher layer signaling, wherein the higher layer signaling uses one of an Radio Link Control (RLC) protocol or an radio resource control (RRC) message, wherein the synthesis request information comprises a pairing identifier, and the pairing identifier is a pairing identifier between the first UE and the second UE, so that the access network device saves the pairing identifier and an identifier of the second UE into the support list of the first UE, sets the second UE as the current supporting UE of the downlink data, and sends synthesis establishment information to the second UE by using the higher layer signaling; and
setting, according to the synthesis establishment information that is sent by the access network device by using the higher layer signaling, a synthetic layer configuration corresponding to the first UE.

23. The method according to claim 21, wherein the method further comprises:
receiving synthesis establishment information that is sent by the access network device by using higher layer signaling;
setting, according to the synthesis establishment information, a synthetic layer configuration corresponding to the first UE; and
returning synthesis establishment response information to the access network device by using the higher layer signaling, wherein the synthesis establishment response information comprises a pairing identifier, and the pairing identifier is a pairing identifier between the first UE and the user equipment, so that the access network device saves the pairing identifier and an identifier of the second UE into the support list of the first UE and sets the second UE as the current supporting UE of the downlink data.

24. The method according to claim 23, wherein the deleting the synthetic layer configuration corresponding to the first UE includes:
sending synthesis release request information to the access network device by using the higher layer signaling, wherein the synthesis release request information comprises the pairing identifier between the first UE and the second UE, so that the access network device deletes the identifier of the second UE and the pairing identifier from the support list of the first UE; and
deleting, according to a synthesis release response information that is returned by the access network device by using the higher layer signaling, the synthetic layer configuration corresponding to the first UE.

25. The method according to claim 24, wherein the deleting the synthetic layer configuration corresponding to the first UE include deleting, according to synthesis deletion information that is sent by the access network device by using the higher layer signaling, the synthetic layer configuration corresponding to the first UE, wherein the synthesis deletion information comprises an identifier of the first UE, and the synthesis deletion information is synthesis deletion information that is sent to the second UE after the access network device determines that the second UE is inappropriate to serve as a supporting UE of the first UE and deletes the identifier of the user equipment and the pairing identifier between the first UE and the second UE from the support list of the first UE.

26. The access network device according to claim 11, wherein the program includes further instructions for:
receiving, by using the higher layer signaling, synthesis release request information sent by the second UE, wherein the synthesis release request information comprises the pairing identifier between the first UE and the second UE;
deleting, based on receipt of the synthesis release request information that is sent by the second UE, the identifier of the second UE and the pairing identifier from the support list of the first UE;
based on deleting the identifier of the second UE and the pairing identifier from the support list of the first UE, sending synthesis release response information to the second UE by using the higher layer signaling, so that the second UE deletes the synthetic layer configuration corresponding to the first UE; and
based on deleting the identifier of the second UE and the pairing identifier from the support list of the first UE, sending second synthesis update information to the first UE by using the higher layer signaling, wherein the second synthesis update information comprises the identifier of the second UE, so that the first UE deletes the synthetic layer configuration corresponding to the second UE.

27. The access network device according to claim 11, wherein the program includes further instructions for:
deleting the identifier of the second UE and the pairing identifier between the first UE and the second UE from the support list of the first UE when it is determined that the second UE is inappropriate to serve as a supporting UE of the first UE;
sending synthesis deletion information to the second UE by using the higher layer signaling, wherein the synthesis deletion information comprises an identifier of the first UE, so that the second UE deletes the synthetic layer configuration corresponding to the first UE; and
sending second synthesis update information to the first UE by using the higher layer signaling, wherein the second synthesis update information comprises the identifier of the second UE, so that the first UE deletes the synthetic layer configuration corresponding to the second UE.

28. The access network device according to claim 27, wherein the program further includes instructions for, after it is determined that the second UE is inappropriate to serve as a supporting UE of the first UE, deleting the identifier of the second UE and the pairing identifier between the first UE and the second UE from the support list of the first UE when it is determined that a time during which the second UE is inappropriate to serve as the supporting UE of the first UE is greater than a preset time threshold.

* * * * *